US011405849B2

(12) United States Patent
Faus Gregori et al.

(10) Patent No.: US 11,405,849 B2
(45) Date of Patent: Aug. 2, 2022

(54) ROAMING ROUTE OPTIMIZATION

(71) Applicant: British Telecommunications Public Limited Company, London (GB)

(72) Inventors: Francisco Faus Gregori, London (GB); Andrew Corston-Petrie, London (GB); Maria Cuevas Ramirez, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/733,667

(22) PCT Filed: Mar. 18, 2019

(86) PCT No.: PCT/EP2019/056673
§ 371 (c)(1),
(2) Date: Sep. 26, 2020

(87) PCT Pub. No.: WO2019/185385
PCT Pub. Date: Oct. 3, 2019

(65) Prior Publication Data
US 2021/0029616 A1   Jan. 28, 2021

(30) Foreign Application Priority Data
Mar. 28, 2018 (EP) .................... 18164564

(51) Int. Cl.
*H04W 40/34* (2009.01)
*H04L 45/00* (2022.01)
(Continued)

(52) U.S. Cl.
CPC ............ *H04W 40/34* (2013.01); *H04L 45/20* (2013.01); *H04L 65/1006* (2013.01); *H04W 8/18* (2013.01)

(58) Field of Classification Search
CPC ........ H04W 40/34; H04W 8/18; H04L 45/20; H04L 65/1006
See application file for complete search history.

(56) References Cited

U.S. PATENT DOCUMENTS 8,086,238 B1   12/2011 Kosar
8,358,624 B1   1/2013 Ghaus et al.
(Continued)

FOREIGN PATENT DOCUMENTS

CN   102387590 A   3/2012
CN   103166949 A   6/2013
(Continued)

OTHER PUBLICATIONS

GSM, "Guidelines for IPX Provider Networks Previously Inter-Service Provider IP Backbone Guidelines," Version—13.0, dated Oct. 17, 2016, 50 pages.
(Continued)

*Primary Examiner* — Chi H Pham
*Assistant Examiner* — Vladislav Y Agureyev
(74) *Attorney, Agent, or Firm* — Patterson Thuente IP

(57) ABSTRACT

A method of managing traffic flow through a multi-node network, the multi-node network interlinking a first mobile network and a second mobile network, the method including, when a subscriber user equipment entity that has as a home network the first mobile network and that is operating in the second mobile network attempts to establish a connection to a correspondent user equipment entity: communicating a connection request message from the second network to the first network over a first route via a set of nodes of the multi-node network; at least one of the nodes of the set: identifying a candidate alternative route between nodes of the multi-node network for at least part of a connection between the subscriber user equipment entity
(Continued)

and the correspondent user equipment entity; and transmitting an indication of the candidate alternative route to a controller; and the controller selecting, in accordance with predetermined criteria, one of the first route and the at least one candidate alternative route and causing the connection to be established between the subscriber user equipment entity and the correspondent user equipment entity at least partially over the selected route.

16 Claims, 11 Drawing Sheets

(51) Int. Cl.
*H04L 65/10* (2022.01)
*H04W 8/18* (2009.01)

(56) References Cited

U.S. PATENT DOCUMENTS

| | | |
|---|---|---|
| 8,489,101 B1 | 7/2013 | Bestermann |
| 9,210,691 B2 | 12/2015 | Ponukumati et al. |
| 9,883,436 B2 | 1/2018 | Brown et al. |
| 9,924,344 B1* | 3/2018 | Datar .................. H04L 65/1016 |
| 10,021,738 B1* | 7/2018 | Mehta .................. H04L 65/1016 |
| 10,123,241 B2 | 11/2018 | Brown et al. |
| 10,182,004 B2 | 1/2019 | Ramirez |
| 10,243,844 B2 | 3/2019 | Ramirez |
| 2002/0006797 A1 | 1/2002 | Virtanen et al. |
| 2002/0187780 A1 | 12/2002 | Souissi |
| 2004/0090913 A1 | 5/2004 | Scudder et al. |
| 2004/0185854 A1 | 9/2004 | Artola et al. |
| 2005/0048972 A1 | 3/2005 | Dorenbosch et al. |
| 2005/0281205 A1 | 12/2005 | Chandwadkar et al. |
| 2006/0268835 A1 | 11/2006 | Hyotylainen et al. |
| 2007/0057843 A1 | 3/2007 | Chang et al. |
| 2008/0039104 A1 | 2/2008 | Gu et al. |
| 2008/0102844 A1 | 5/2008 | Zhu et al. |
| 2008/0102866 A1 | 5/2008 | Fiorillo et al. |
| 2008/0112364 A1 | 5/2008 | Kwon et al. |
| 2008/0205452 A1 | 8/2008 | Chou |
| 2008/0293394 A1 | 11/2008 | Silver et al. |
| 2010/0015946 A1 | 1/2010 | Zhang |
| 2010/0157794 A1 | 6/2010 | Nakash |
| 2010/0235540 A1* | 9/2010 | Korhonen .............. H04W 8/10 709/244 |
| 2010/0291924 A1 | 11/2010 | Antrim et al. |
| 2011/0069618 A1 | 3/2011 | Wong et al. |
| 2011/0217979 A1 | 9/2011 | Nas |
| 2011/0281582 A1 | 11/2011 | Jiang |
| 2012/0021744 A1 | 1/2012 | Chin et al. |
| 2012/0122515 A1 | 5/2012 | Han et al. |
| 2013/0108032 A1 | 5/2013 | Shaw |
| 2013/0121154 A1 | 5/2013 | Guay et al. |
| 2013/0148574 A1 | 6/2013 | Liu et al. |
| 2013/0223230 A1 | 8/2013 | Swaminathan et al. |
| 2013/0237245 A1 | 9/2013 | Tinnakornsrisuphap et al. |
| 2013/0267229 A1 | 10/2013 | Gopalakrishnan |
| 2013/0286936 A1 | 10/2013 | Sen et al. |
| 2013/0303240 A1 | 11/2013 | Sanka et al. |
| 2013/0315062 A1 | 11/2013 | Riedl et al. |
| 2014/0066069 A1 | 3/2014 | Salami et al. |
| 2014/0114568 A1 | 4/2014 | Park |
| 2014/0155112 A1 | 6/2014 | Molnar et al. |
| 2014/0169286 A1* | 6/2014 | Xu .................. H04W 8/082 370/329 |
| 2014/0185531 A1* | 7/2014 | Liu .................. H04L 45/125 370/329 |
| 2014/0187243 A1 | 7/2014 | Rune et al. |
| 2014/0233449 A1 | 8/2014 | Laroia et al. |
| 2014/0258434 A1 | 9/2014 | Hong et al. |
| 2014/0341184 A1 | 11/2014 | Dhanda et al. |
| 2014/0378129 A1 | 12/2014 | Jiang et al. |
| 2015/0038154 A1 | 2/2015 | Ponukumati et al. |
| 2015/0097731 A1 | 4/2015 | Russell |
| 2015/0098391 A1 | 4/2015 | Sridhar et al. |
| 2015/0103739 A1 | 4/2015 | Ni et al. |
| 2015/0126187 A1 | 5/2015 | Ponukumati et al. |
| 2015/0131526 A1* | 5/2015 | Noldus .................. H04L 65/105 370/328 |
| 2015/0139015 A1 | 5/2015 | Kadous et al. |
| 2015/0296364 A1 | 10/2015 | Peruru et al. |
| 2015/0334604 A1 | 11/2015 | Banks et al. |
| 2016/0021660 A1 | 1/2016 | Krishnamurthy |
| 2016/0029281 A1 | 1/2016 | Zhou et al. |
| 2016/0080505 A1* | 3/2016 | Sahin .................. H04L 67/1027 709/229 |
| 2016/0095036 A1 | 3/2016 | Stojanovski et al. |
| 2016/0183281 A1 | 6/2016 | Yeh et al. |
| 2016/0205605 A1 | 7/2016 | Krishnamurthy |
| 2016/0262200 A1 | 9/2016 | Su |
| 2016/0295439 A1 | 10/2016 | Yang et al. |
| 2017/0094628 A1 | 3/2017 | Miao et al. |
| 2017/0111828 A1 | 4/2017 | Tsai |
| 2017/0127217 A1 | 5/2017 | Miao et al. |
| 2017/0188223 A1* | 6/2017 | Gundavelli ............ H04W 48/16 |
| 2017/0251028 A1* | 8/2017 | Bollapalli ............ H04L 65/1006 |
| 2017/0332301 A1 | 11/2017 | Horn et al. |
| 2017/0347298 A1 | 11/2017 | Brown et al. |
| 2018/0063724 A1* | 3/2018 | Zhang .................. H04W 8/02 |
| 2018/0077053 A1 | 3/2018 | Cuevas Ramirez et al. |
| 2018/0077054 A1 | 3/2018 | Cuevas Ramirez et al. |
| 2018/0255494 A1* | 9/2018 | Ku .................. H04W 36/14 |
| 2018/0262922 A1 | 9/2018 | Mackenzie et al. |
| 2019/0028983 A1 | 1/2019 | Mackenzie et al. |
| 2019/0044932 A1* | 2/2019 | Kumar .................. H04W 12/121 |
| 2019/0253389 A1* | 8/2019 | Verma .................. H04W 12/088 |
| 2020/0236595 A1 | 7/2020 | Ramirez |
| 2020/0236603 A1 | 7/2020 | Ramirez |
| 2020/0267542 A1* | 8/2020 | Pronk .................. H04W 8/12 |
| 2021/0029616 A1* | 1/2021 | Faus Gregori .......... H04L 45/20 |
| 2021/0044569 A1* | 2/2021 | Xu .................. H04L 67/2814 |
| 2021/0058434 A1* | 2/2021 | Noldus .............. H04L 65/1026 |

FOREIGN PATENT DOCUMENTS

| | | |
|---|---|---|
| CN | 103460756 A | 12/2013 |
| CN | 104106274 A | 10/2014 |
| CN | 105101164 A | 11/2015 |
| CN | 105247908 A | 1/2016 |
| CN | 105340331 A | 2/2016 |
| CN | 105706501 A | 6/2016 |
| CN | 106464611 A | 2/2017 |
| CN | 106465464 A | 2/2017 |
| EP | 2237506 A1 | 10/2010 |
| EP | 2312798 A1 | 4/2011 |
| EP | 2434816 A2 | 3/2012 |
| EP | 2605555 A2 | 6/2013 |
| EP | 2857798 A1 | 4/2015 |
| EP | 2750444 A4 | 5/2015 |
| EP | 2991242 A1 | 3/2016 |
| GB | 2559556 A | 8/2018 |
| GB | 2559731 A | 8/2018 |
| GB | 2560754 A | 9/2018 |
| GB | 2560899 A | 10/2018 |
| JP | 2993087 B2 | 12/1999 |
| JP | 2001209891 A | 8/2001 |
| KR | 20100081025 A | 12/2010 |
| WO | WO-2009121833 A1 | 10/2009 |
| WO | WO-2010133256 A1 | 11/2010 |
| WO | WO-2011095687 A1 | 8/2011 |
| WO | WO-2013174440 A1 * | 11/2013 ......... H04L 65/1069 |
| WO | WO-2014021761 A2 | 2/2014 |
| WO | WO-2014130764 A1 | 8/2014 |
| WO | WO-2015177601 A1 | 11/2015 |
| WO | WO-2015180126 A1 | 12/2015 |
| WO | WO-2016095584 A1 | 6/2016 |
| WO | WO-2016150668 A1 | 9/2016 |
| WO | WO-2016150669 A1 | 9/2016 |
| WO | WO-2018145796 A1 | 8/2018 |
| WO | WO-2018145797 A1 | 8/2018 |
| WO | WO-2018172002 A1 | 9/2018 |
| WO | WO-2018172003 A1 | 9/2018 |

(56) References Cited

FOREIGN PATENT DOCUMENTS

OTHER PUBLICATIONS

International Search Report for Application No. PCT/EP2019/056673, dated Apr. 5, 2019, 3 pages.
3GPP TS 23.122, Generation Partnership Project; Technical Specification Group Core Network and Terminals; Non-Access-Stratum (NAS) functions related to Mobile Station (MS) in idle mode, 3rd Generation Partnership Project (3GPP), Mobile Competence Centre; 650, Route Des Lucioles; F-06921 Sophia-Antipolis Cedex; France, vol. CT WG1, No. V12.9.0, Jun. 24, 2016, XP051295206, (Release 12), 1 page.
3rd Generation Partnership Project; Technical Specification Group Radio Access Network; Evolved Universal terrestrial Radio Access (E-UTRA) and Evolved Universal Terrestrial Radio Access Network (E-UTRAN); Radio interface protocol aspects (Release 7), Oct. 17, 2006, XP050909974, 1 page.
Chandra K., et al., "CogCell: Cognitive Interplay between 60 GHz Picocells and 2.4/5 GHz Hotspots in the 5G Era," IEEE Communications Magazine, May 7, 2015, 14 pages.
Christodoulou C. G., et al., "Reconfigurable Antennas for Wireless and Space Applications," Proceedings of the IEEE, Jul. 2012, vol. 100, No. 7, pp. 2250-2261.
Combined Search and Examination Report under Section 17 and 18(3) for Application No. 1702030.6, dated Jul. 7, 2017, 2 pages.
Combined Search and Examination Report under Sections 17 & 18(3) for Great Britain Application No. 1704702.8, dated Aug. 14, 2017, 2 pages.
Corrected Search Report under Section 17 for Great Britain Application No. GB1702033.0, dated Jun. 29, 2017, 2 pages.
Examination Report under section 18(3) for Application No. 1702030.6, dated May 3, 2019, 2 pages.
Examination Report under Section 18(3) for Great Britain Application No. 1704702.8, dated Oct. 22, 2019, 4 pages.
Examination Report Under Section 18(3) for Great Britain Application No. GB1704702.8, dated Jun. 17, 2019, 2 pages.
Extended European Search Report for Application No. 17155116.1, dated Jul. 6, 2017, 8 pages.
Extended European Search Report for Application No. 17155118.7, dated Aug. 29, 2017, 7 pages.
Extended European Search Report for Application No. 17162851.4, dated Sep. 5, 2017, 13 pages.
Extended European Search Report for Application No. 17162854.8, dated Aug. 31, 2017, 18 pages.
Extended European Search Report for Application No. EP15275086.5, dated Sep. 8, 2015, 11 pages.
Great Britain Combined Search and Examination Report under Sections 17 & 18 (3) for Application No. GB1702033.0, dated Nov. 29, 2017, 1 page.
Great Britain Combined Search and Examination Report Under Sections 17 & 18(3) for Application No. GB1704694.7, dated Aug. 14, 2017, 2 pages.
Great Britain Examination Report under Section 18(3) for Application No. GB1704694.7, dated Jun. 5, 2019, 1 page.
Great Britain Search Report Under Section 17 for Application No. GB1704694.7, dated Aug. 11, 2017, 2 pages.
International Preliminary Report on Patentability for Application No. PCT/EP2016/054462, dated Oct. 5, 2017, 9 pages.
International Preliminary Report on Patentability for Application No. PCT/EP2016/054457, dated Feb. 22, 2017, 7 pages.
International Preliminary Report on Patentability for Application No. PCT/EP2017/082585, dated Aug. 22, 2019, 10 pages.
International Preliminary Report on Patentability for Application No. PCT/EP2017/082586, dated Aug. 22, 2019, 7 pages.
International Preliminary Report on Patentability for Application No. PCT/EP2018/054134, dated Oct. 3, 2019, 20 pages.
International Preliminary Report on Patentability for Application No. PCT/EP2018/054135, dated Oct. 3, 2019, 11 pages.
International Search Report and Written Opinion for Application No. PCT/EP2016/054457, dated Apr. 18, 2016, 18 pages.
International Search Report and Written Opinion for Application No. PCT/EP2016/054462, dated Apr. 12, 2016, 12 pages.
International Search Report and Written Opinion for Application No. PCT/EP2017/082585, dated Apr. 9, 2018, 11 pages.
International Search Report and Written Opinion for Application No. PCT/EP2017/082586, dated Feb. 9, 2018, 9 pages.
International Search Report and Written Opinion for Application No. PCT/EP2018/054134, dated Apr. 5, 2018, 23 pages.
International Search Report and Written Opinion for Application No. PCT/EP2018/054135, dated Apr. 26, 2018, 12 pages.
Legg, P., et al., "Load Balancing and Aggregation Algorithms for LTE Dual Connectivity," 2016 IEEE 83rd Vehicular Technology Conference (VTC Spring), May 15, 2016, 5 pages.
Lesslie R G., et al., "The Application of a Simple Spatial Multi-Criteria Analysis Shell to Natural Resource Management Decision Making," ResearchGate, Jan. 2008, 26 pages.
Office Action For Chinese Application No. 201880011588.7, dated Aug. 2, 2021, 21 pages.
Office Action For Chinese Application No. 201880019173.4, dated Sep. 1, 2021, 9 pages.
Search Report under Section 17 for Great Britain Application No. GB1702033.0, dated Jun. 29, 2017, 1 page.
Search Report under Section 17 for Great Britain Application No. 1702030.6, dated Jul. 6, 2017, 1 page.
Search Report Under Section 17 for Great Britain Application No. GB1704702.8, dated Aug. 10, 2017, 2 pages.
Tunon D., et al., "Adding Dimensions to Wireless Systems with Orientation-Aware Devices and Reconfigurable Antennas," International Conference on Computing, Networking and Communications, Invited Position Papers, 2014, pp. 298-302.
Viprinet: Bonding LTE / 4G via LTE Routers—Better Than Load Balancing | LTE /4G, "LTE—We Combine the Latest Mobile Phone Generation!," Jul. 1, 2019, retrieved from https://www.viprinet.com/en/technology/combinable-media/lte-4g, 4 pages.
Yang Z., et al., "Sensor-Assisted Codebook-Based Beamforming for Mobility Management in 60 GHz WLANs," IEEE 12th International Conference on Mobile Ad Hoc and Sensor Systems, 2015, pp. 333-341.

* cited by examiner

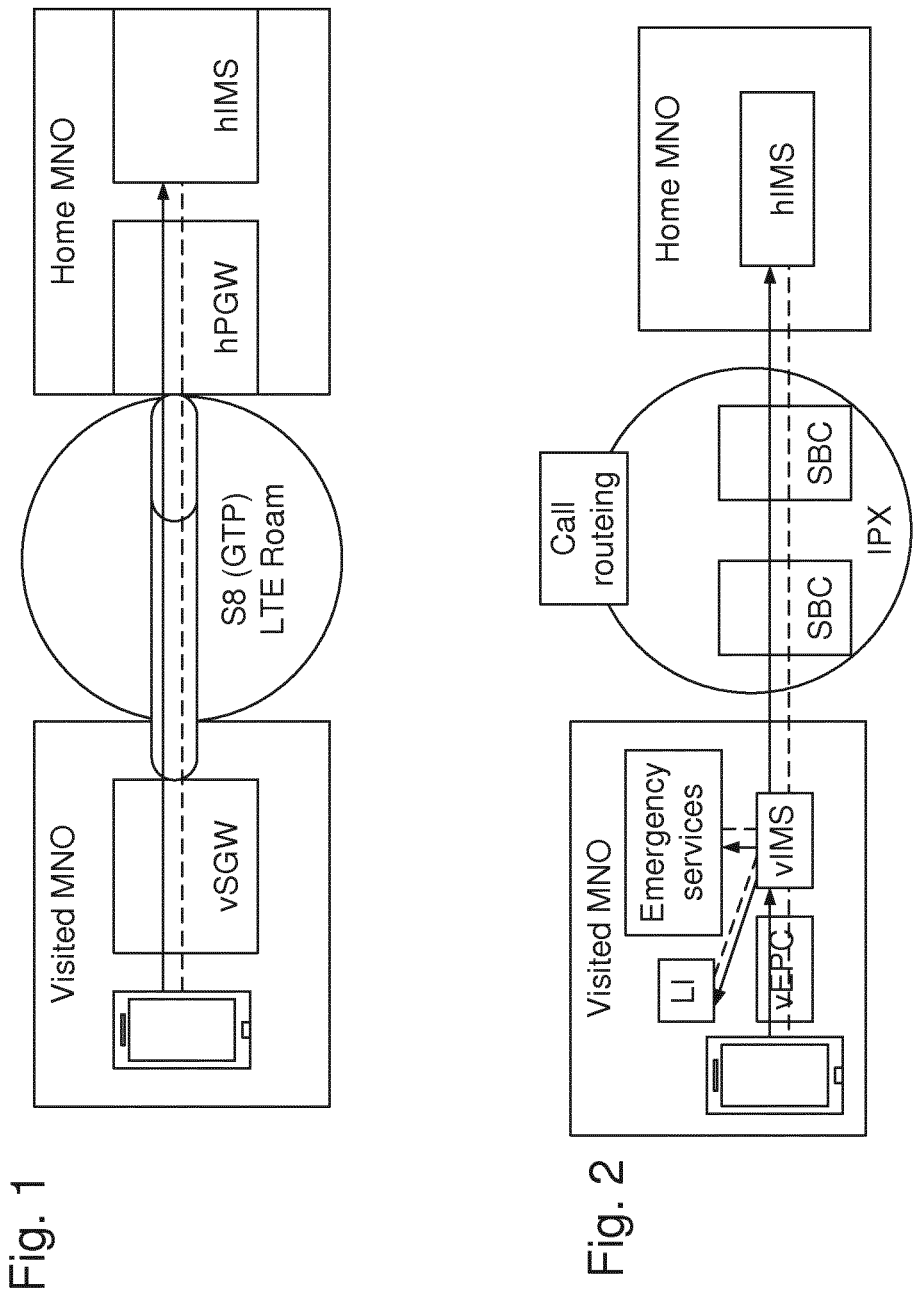

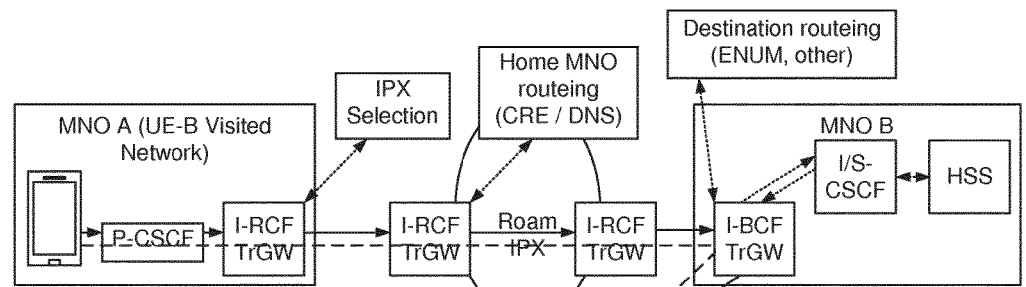
Fig. 3
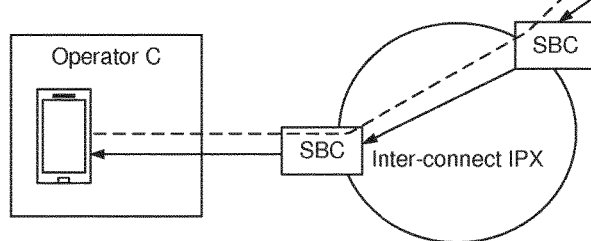
Fig. 4
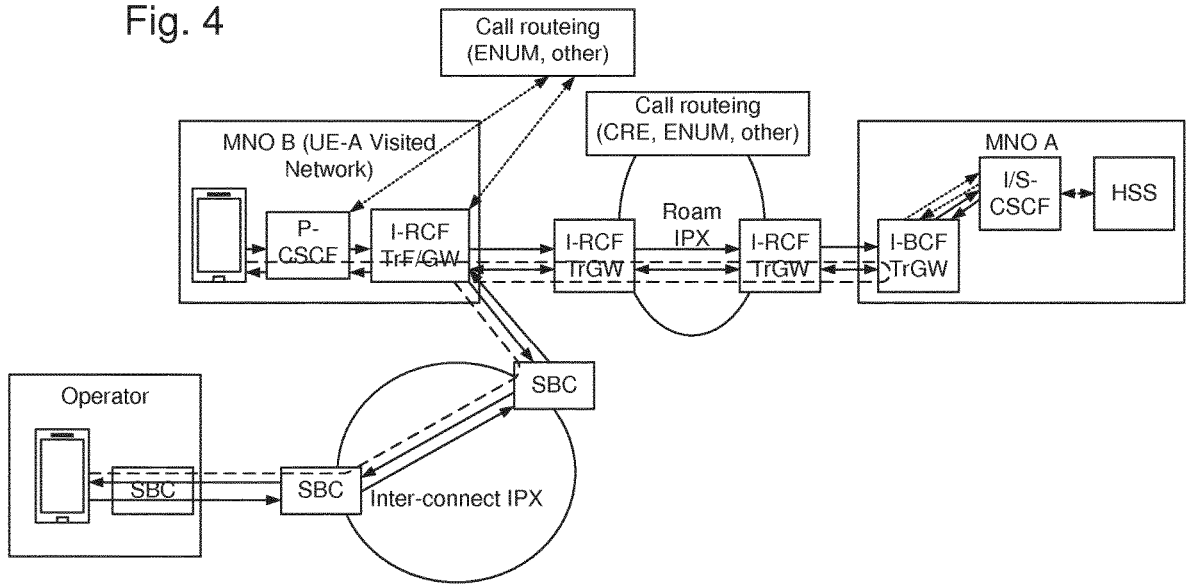

ROAMING ROUTE OPTIMIZATION

PRIORITY CLAIM

The present application is a National Phase entry of PCT Application No. PCT/EP2019/056673, filed Mar. 18, 2019, which claims priority from EP Patent Application No. 18164564.9, filed Mar. 28, 2018, each of which is hereby fully incorporated herein by reference.

TECHNICAL FIELD

This disclosure relates to managing the paths by which communications are routed in a network. It may, for example, be used to manage the paths used by a roaming IPX interconnect system for delivering traffic from a VoLTE (Voice over LTE) device when the device is roaming at a visited network.

BACKGROUND

VoLTE is a mechanism for supporting voice communications over LTE networks. VoLTE communications take place between items of User Equipment (UE). Each UE is associated with a home network. The home network is operated by an entity which, for that UE, is considered to be a Home Mobile Network Operator (H-MNO).

The UE may find itself located within an area where coverage is provided by a different operator from its H-MNO. This is known as roaming. If the UE initiates a VoLTE call in that area it will first communicate with that different operator. In that scenario that different operator is considered to be a Visited Mobile Network Operator (V-MNO). The V-MNO may allow the visiting UE to obtain services from its H-MNO.

If the UE that is visiting the V-MNO wants to make a call to another UE, that other UE may be located in the network of the V-MNO, or in the network of the H-MNO or in some other network. A problem arises of how best to route this call from the originating UE to the terminating UE.

The H-MNO and the V-MNO may be connected by a direct interconnect or by a more generally accessible network. Typically, such a network is the IPX network. Communications over the IPX network are supported by carriers who might be different from the H-MNO and the V-MNO.

Currently, there are two principal models proposed for providing a VoLTE roaming service: S8HR and LBO.

In S8HR (S8 interface home routing) the V-MNO only provides radio access network service (in the case of LTE) and partial EPC (Evolved Packet Core) network service (in the case of MME/SGW) to the roaming UE. The LTE data bearer carrying VoLTE packets is terminated at the packet gateway (PGW) of the roaming UE's H-MNO. In this model all the IMS-aware (IP Multimedia Subsystem) infrastructure is provided by the H-MNO, which will route all MOC (Mobile Originating Calls) as if they were originated in the home environment (except for some exceptions like emergency services). This is illustrated in FIG. 1.

In LBO (Local Break Out) the V-MNO provides a local break out of the data bearer. The data bearer terminates at the visited PGW, and the first IMS component in the VoLTE call flow is the V-MNO's P-CSCF (proxy call server control function). This is illustrated in FIG. 2.

In both cases, to provide a standard VoLTE roaming call flow, any MOC (Mobile Originating Call) must first reach the H-MNO S-CSCF (Serving Call Control Function) in the home IMS via a so-called "roaming leg" before it can be routed to the final destination. The way the roaming leg of the call is routed from the V-MNO to the H-MNO can be unpredictable. Typically, it will rely on a hop-by-hop routing decision made by intermediate nodes to find the H-MNO domain.

When the call reaches the H-MNO, it has two options to complete the call setup towards the operator where the destination number is hosted. In one option the H-MNO can route the call itself via a network interconnect. This is the only possibility in S8HR, and is also available in LBO when it is known as LBO-HR (LBO Home Routing). See FIG. 3. In another option the H-MNO can send the call back to the V-MNO to select V-MNO routing capabilities and network interconnects. This is known as LBO-VR (LBO Visited Routing). See FIG. 4.

The routing mechanism of LBO-VR uses a function called TRF (Transit and Roaming Function) hosted in the V-MNO. Once call signaling has been established via the H-MNO and the TRF elements in the LBO-VR architecture, the call media flow might be optimized to avoid the same tromboning path if specific features (e.g. OMR) are supported by all the proxy elements. Network interconnects to destination networks used by either the H-MNO or V-MNO can also be provided via third party carriers, and can be part of their IPX offering. This is designated "Interconnect IPX" in the figures, in distinction to "Roam IPX" whose main purpose is to interconnect the V-MNO and H-MNO roaming leg as described above.

FIG. 5 shows an example of a roaming MOC (UE-B) where the destination is another VoLTE UE (UE-C) roaming in a visited network. UE-C thus receives a roaming MTC (Mobile Terminating Call).

FIGS. 6 to 8 present abstractions of the routing models described previously. In these figures the intermediate network domains with routing capabilities, which could belong to roaming or interconnect IPX providers, are represented as "Proxies". The V-MNO, H-MNO and the operator where the called party is sitting are indicated. FIG. 6 shows an abstraction of the end-to-end routing model. FIG. 7 shows an abstraction of the LBO-HR routing model. FIG. 8 shows an abstraction of the LBO-VR routing model.

The overall VoLTE roaming MOC routing mechanism previously described may have limitations. For example:

1. There is no end-to-end control over the path through nodes of the IPX network to reach the H-MNO from the V-MNO in the first roaming leg. This may result in routing inconsistency or unpredictability, suboptimal paths or use of intermediate domains not accepted by one of the MNOs for commercial, regulatory or other reasons.

2. It assumes that only the visited network implements the TRF function to allow LBO-VR and it is the only alternative to home routing in order to route to the destination network.

3. If any other routing domain (e.g. IPX provider) in the path from the V-MNO to the H-MNO wanted to offer its own TRF to propose an alternative route, it would have to replace the previous TRF inserted by the V-MNO.

4. The information sent to the H-MNO through the LBO-VR signaling implementation does not provide information about the real domain hosting the TRF (e.g. V-MNOA, IPX1 or IPX2 as in the example of FIG. 5), because the TRF contact URI can be formatted as a simple IP address with no explicit mention to the IMS routing domain hosting it.

5. The H-MNO may have to perform a blind routing decision: whether to route directly to the final destination (home routing) or via the signaled TRF, as it will not receive through signaling any indication about routing metrics that differentiate one against the other (except for the theoretical knowledge of the destination operator, which can vary depending on portability, call-diversion or roaming circumstances of the destination number).

6. Media path optimization to avoid tromboning in LBO-VR is difficult to achieve, as it requires active support from all the elements in the call flow.

7. Different routing modes may be used simultaneously by an IPX node for different PLMN traffic, but once a network operator has decided upon a particular mode and that decision has propagated to the IPX nodes, the same mode will be used for all subsequent examples of that PLMN traffic until the operator propagates a different decision. This is inflexible because there is no easy way to influence the path taken by individual traffic.

SUMMARY

According to one example there is provided a method of managing traffic flow through a multi-node network, the multi-node network interlinking a first mobile network and a second mobile network, the method comprising, when a subscriber user equipment entity that has as a home network the first mobile network and that is operating in the second mobile network attempts to establish a connection to a correspondent user equipment entity: communicating (optionally, by means of the multi-node network) a connection request message from the second network to the first network over a first route via a set of nodes of the multi-node network; at least one of the nodes of the set: identifying a candidate alternative route between nodes of the multi-node network for at least part of a connection between the subscriber user equipment entity and the correspondent user equipment entity; and transmitting (optionally, by means of the multi-node network) an indication of the candidate alternative route to a controller; and the controller selecting, in accordance with predetermined criteria, one of the first route and the at least one candidate alternative route and causing the connection to be established between the subscriber user equipment entity and the correspondent user equipment entity at least partially over the selected route.

The aforementioned method may be performed by: a node of the multi-node network; the first mobile network; the second mobile network; and/or the set of nodes.

Optionally, the controller is arranged within: a node of the multi-node network; the first mobile network; the second mobile network; the subscriber user equipment; the correspondent user equipment; and/or the set of nodes.

The controller may be a single physical and/or logical network element or its functions may be split over multiple physical and/or logical network elements. Optionally, the controller is incorporated as part of a Route Decision Function and/or as part of an alternative route selection module.

Identifying the candidate alternative route may comprise determining a metric of the candidate alternative route. The method may comprise transmitting an indication of the metric to the controller. Selecting one of the first route and the candidate alternative route is performed in dependence on the indicated metric. Optionally, the metric is an indicator of performance of a network connection.

The metric may be or may be dependent on any one or more of (i) estimated data loss, (ii) estimated delay, and (iii) number of hops in the route.

Selecting one of the first route and the at least one candidate alternative route may be performed in dependence on the identity of an operator of at least one node of the first route or the candidate alternative route.

The candidate alternative route may extend between the second mobile network and a network in which the correspondent user equipment entity is operating.

The candidate alternative route may extend between the second mobile network and a network in which the correspondent user equipment entity is operating without passing via the first mobile network.

The at least one node may detect a request to establish a connection. Identifying the candidate alternative route may be performed in response to that detection.

The request may be a SIP session request.

The at least one node may forward the request to a subsequent node on the first route. Transmitting an indication of the candidate alternative route to the first mobile network may comprise the at least one node adding an indication of the candidate alternative route to the request.

Transmitting an indication of the candidate alternative route to the first mobile network may comprise transmitting the indication by a route other than the first route.

The network may be an IPX network.

The controller may be located in the first mobile network.

The controller may define an operational characteristic (or, optionally, an operational constraint) of the candidate alternative route, and may cause a connection to be established between the subscriber user equipment entity and the correspondent user equipment entity at least partially over the candidate alternative route implementing that operational characteristic (or, optionally, the operational constraint).

The operational characteristic (or, optionally, operational, constraint) may be MediaBypass enforcement.

According to a second aspect there is provided a network routing node for routing traffic in a multi-node network, the multi-node network interlinking a first mobile network and a second mobile network, the network node being configured to: detect a request to establish a connection between a subscriber user equipment entity (2) that has as a home network the first mobile network (4) and that is operating in the second mobile network (5) and a correspondent user equipment entity (3), the request traversing a first route via set of nodes of the multi-node network; identify a candidate alternative route between nodes of the multi-node network for at least part of a connection between the subscriber user equipment entity and the correspondent user equipment entity; and transmit an indication of the candidate alternative route to a route selection controller.

The node may be configured to determine a metric of the candidate alternative route and transmit an indication of the metric to the route selection controller.

The node may be configured to forward the request to a subsequent node on the first route and to transmit the indication of the candidate alternative route to the route selection controller by adding an indication of the candidate alternative route to the request.

The predetermined criteria may vary with prevailing network conditions.

BRIEF DESCRIPTION OF THE DRAWINGS

The present disclosure will now be described by way of example with reference to the accompanying drawings. In the drawings:

FIG. 1 illustrates S8HR routing.
FIG. 2 illustrates LBO routing.
FIG. 3 illustrates LBO-HR routing.

FIG. 4 illustrates LBO-VR routing.

DETAILED DESCRIPTION

In the present application abbreviations generally used in LTE (Long Term Evolution) signaling should be understood as having their meaning as normally used in that field. The present invention should not be understood as being limited to use with LTE systems as they currently exist or are proposed. The present invention may be used with systems that are future developments of current LTE systems, even if different terminology is used to describe such future systems.

In the system to be described below, session routing from a device on an originating network to a device in a destination network can be altered on a case-by-case basis, for instance to optimize the end-to-end path. In one example the system provides an arrangement in which entities in the routing chain have different roles in the decision making process. Information provided by those entities can be used to inform a routing decision.

Figure 9:
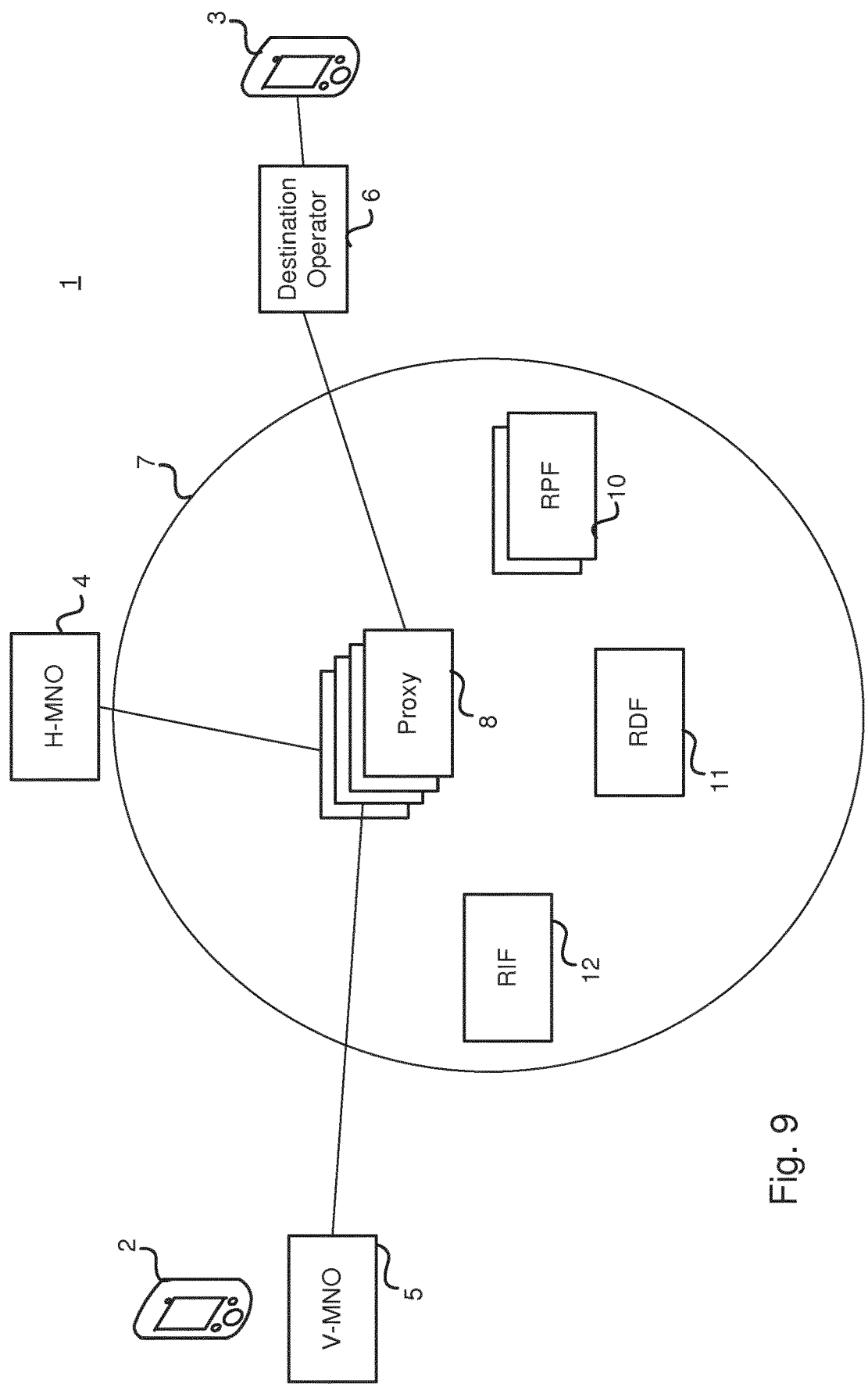
FIG. 9 is a schematic drawing of the routing system of the first embodiment.

FIG. 9 shows an overview of a routing system 1 in a first embodiment to enable a first UE 2 make a call to a correspondent UE 3. The UE 2 is a subscriber of a home mobile network operator (H-MNO) 4 which is currently roaming and therefore connected to a visited mobile network operator (V-MNO) 5. The correspondent UE 3 is connected to a destination network operator 6. An IPX network 7 formed of a number of IPX nodes (also known as proxies) 8 allows for data sessions to be conducted between the different network operators 4, 5, 6.

In this embodiment, the system 1 also comprises three main functions. Each of these, and their sub-modules, may be provided by a dedicated network device or by software running on a multipurpose network element.

1. A route proposal function (RPF) 10. This can be located physically and/or logically in an IPX node 8 but is shown as a separate entity in the figures for ease of explanation. The RPF 10 analyses the properties of a set of upstream traffic from a device on a visitor network 5 to the device's home network 4. Based on that analysis it may propose a more efficient path for such traffic.

2. A route decision function (RDF) 11. This can be located physically or logically in an IPX node 8. The RDF compares a set of proposals received from one or more RPFs and may use select one as a preferred path.

3. A Route Implementation Function (RIF) 12. This can be located physically or logically in an IPX node 8. The RIF 12 can change the path of a call flow, e.g. in response to an indication of a path received from the RDF 11.

Nodes 8 in the IPX networks 7 are typically software elements that can be hosted in dedicated hardware appliances or virtualized in a common shared infrastructure. Each of the RPF 10, RDF 11 and RIF 12 functions may be provided at an IPX node 8. They may be provided at the same or different IPX nodes 8.

Figure 10:
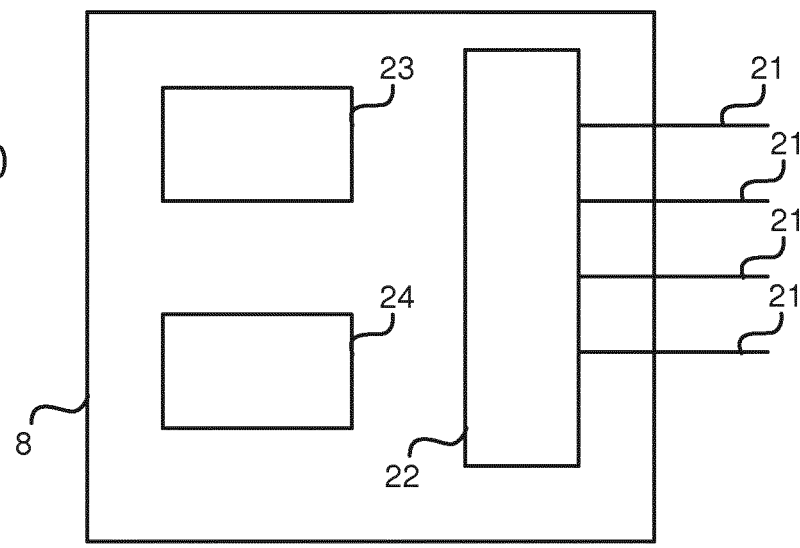
FIG. 10 is a schematic drawing of an IPX node.

FIG. 10 is a schematic diagram of the hardware providing an IPX node 8. It has a series of connections 21 to other IPX nodes 8. The connections 21 are coupled to a switch 22. The switch 22 can pass traffic between the connections 21 under the control of a processor 23. The processor 23 executes code stored in non-transient form in memory 24. The code is such as to, when executed by the processor 23, cause it to perform the functions described herein. Those may include implementing any one or more of an RPF 10, an RDF 11 or an RIF 12, or sub-parts thereof. The processor 23 can analyze traffic arriving from any of the connections 21 and can control the switch to route that traffic as desired. The processor 23 can also generate its own messaging and transmit it over any of the connections 21, for example to signal another unit 8 in the IPX network 7.

Figure 11:
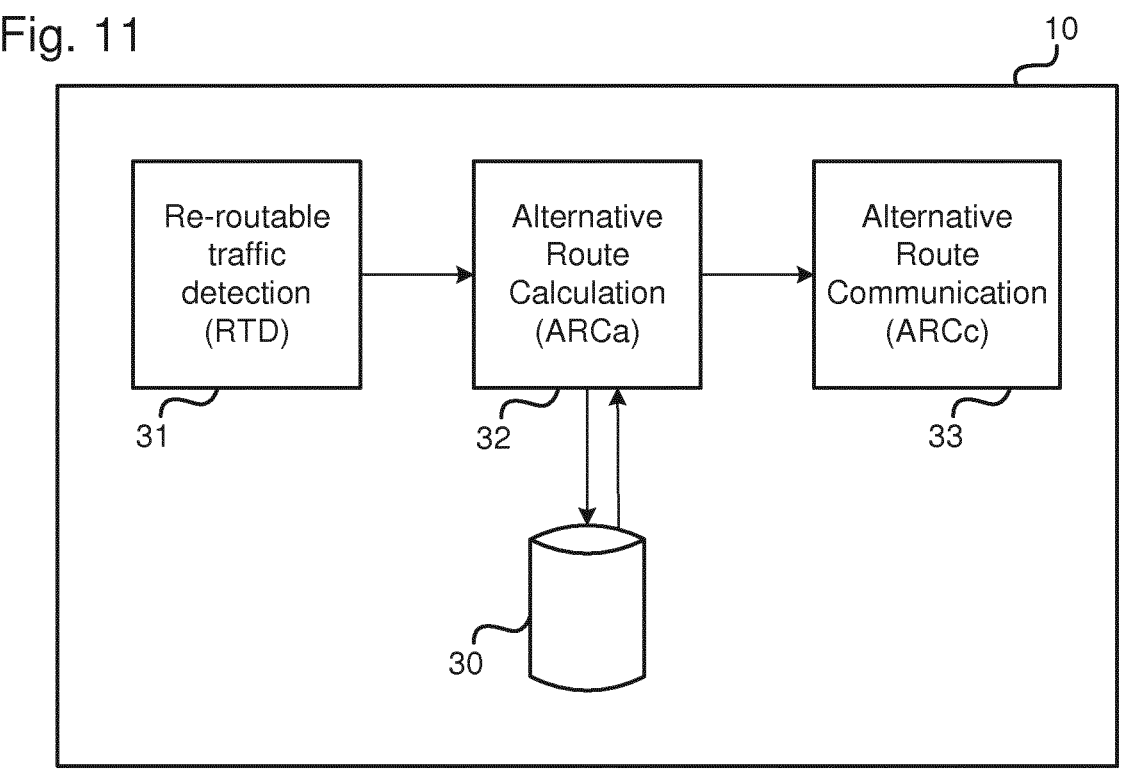
FIG. 11 is a schematic drawing of a route proposal function.

FIG. 11 illustrates the logical structure of the RPF 21. The route proposal function (RPF 21) is responsible for assessing the route taken by the roaming mobile device's 2 data packets through the IPX network 7, and using information defining the IPX architecture to propose an alternative path for the packet flow. The RPF 21 may propose an alternative path in response to load on a node 8 exceeding a threshold, or in response to changes to commercial agreements which make a particular node more or less desirable. An RPF 21 may have access to a database 30 containing a predetermined set of policies that it can use to determine that an alternative path is available and/or desirable. The RPF 2 may comprise a re-routable traffic detection (RTD) module 31 which is configured to detect traffic flows for which the RPF might find an alternative route; an alternative route calculation (ARCa) module 32 which calculates a preferred alternative route towards the final destination; and an alternative route communication (ARCo) module 33 which may send an alternative route to a decision function (RDF) 11.

Figure 12:
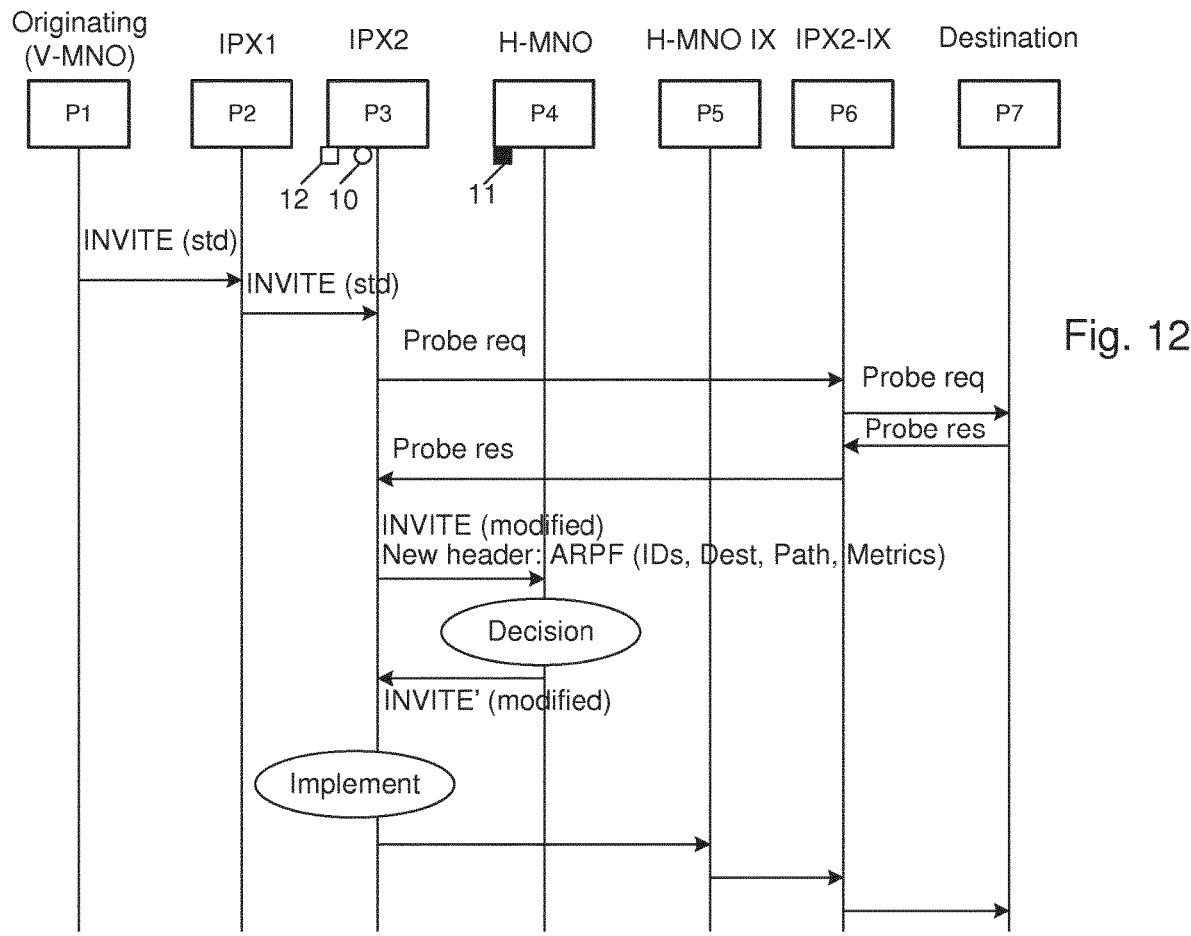
FIG. 12 shows the implementation of a route proposal function.

FIG. 12 illustrates in detail an example of a process that may be used by the ARCa module 32 to determine an alternative path in an IPX architecture interconnecting a V-MNO 5 and an H-MNO 4 for a mobile originating call from a roaming UE 2.

In FIG. 12 node P1 represents the IMS proxy of the V-MNO 5. The IMS proxy uses IPX provider proxy (node P2) to route inbound roaming traffic. Node P3 is the IPX proxy that provides roaming interconnect services to the H-MNO 4. Node P4 is the H-MNO 4. The initial call flow in a VoLTE roaming scenario requires first that the H-MNO 4 is contacted to provide home services for a roaming subscriber. To achieve this using a conventional hop-by-hop VoLTE call routing mechanism the initial route might be P1 to P2 to P3 to P4. Subsequently, signaling to complete the call setup can proceed towards the operator where the destination number is hosted (at node P7 in this example). Under current VoLTE/IMS arrangements the proxy charged with deciding the final route to the destination operator is the H-MNO (P4) 4. It can choose to use its own network interconnect (P5), or can pass the call back to the V-MNO 5 (P2) which would use its own network interconnect (P6).

In this call-flow, the RPF 10 could conveniently be implemented by any node between P1 and P4. In this example it is at node P3. The modules of the RPF 10 behave as follows:

1. The RTD module 31 within the RPF in P3 will receives a SIP INVITE message from the preceding proxy P2. The RTD module 31 identifies this as a new VoLTE-R MOC call setup message to which the capabilities of the RTD module 31 can be applied.
2. The ARCa module 32 within the RPF in P3 queries a database 30 to find a route to the network destination of the VoLTE roaming call (node P7). This may be a direct route, i.e. one that bypasses the H-MNO 4. Preferably it is an optimal route according to predefined selection criteria available to the ARCa module 32. Once a candidate route has been identified the ARCa module 32 will send a probe request to the destination node (P7). This may be done in a standard SIP message (e.g. OPTIONS). The message is sent to the destination node via the first hop in the identified route to the destination node, which in this example is P6.
3. The recipient of the probe request, P7, replies with information about the metrics of the route, e.g. cost and delay. When that response arrives at the ARCa module 32 it will know the metrics and also other details of the alternative path (e.g. the intermediate nodes it traverses). It can use that information to build a proposal that will be sent to the route decision function 11.
4. The ARCo module 33 sends that proposal to the RDF 11. The communication method used by the ARCo module 33 to the RDF 11 will depend on the actual system characteristics, and on whether an in-band or out-of-band method is used.

If an in-band approach is used, the alternative route details could be sent from the RPF 10 in P3 to the RDF 11 in P4 formatted as a new SIP header within the regular INVITE message that would follow its standard VoLTE roaming-leg routing towards the H-MNO 4. The format of the new header could include the following information:

a. an identification of the nature of the header
b. identification of the RPF 10 originating the message, e.g. as the URI of the RPF 10
c. an identification of a proposed RIF, e.g. as the URI of the RIF 12
d. the final destination of the alternative route proposal (node P7 in this example)
e. the proposed path to the destination (P6 to P7 in this example)
f. metrics of the proposed route, e.g. cost and delay
g. any optional parameters, e.g. MediaBypass enforcement The details of the message can vary to suit an implementation. The message may incorporate partly the format of standard headers and procedures of the current TRF mechanism, e.g. "feature-caps".

Any of multiple nodes on the path to the RDF 11 can implement the functions of an RPF 10, by adding their own independent Alternative Route Proposal Function (ARPF headers) in the message as they intercept it and relay it to the RDF 11. Thus, when the message reaches the RDF 11 it may contain multiple routing proposals. Routing proposals can also be sent to the RDF 11 by separate messages.

In this RPF in-band mechanism, the ARPF message that is intercepted and modified by the RPF 10 needs to pass the RDF 10 on the default route to its final destination. If the RDF 11 is at the H-MNO 4 then that can occur because in VoLTE roaming the roaming-leg targets the H-MNO 4. Thus, it is convenient for the RDF 11 to be located at the H-MNO 4. This can also help to maintain the principle of IMS architecture whereby home services have to be granted also to roaming users. If the RDF 11 is not in the default path of the call flow to destination, the RPF 10 can modify the routing of the message so that it will reach the RDF 11 on the path to the destination. It may do this by adding a new SIP route header (with loose-route indicator) containing the address of the RDF 10.

Alternatively, the RPF 10 can use an out-of-band mechanism to communicate the alternative route details to the RDF 11 in another message independent to the incoming message flow. Preferably, the RDF 11 is configured to collate multiple alternative route proposals before making a routing decision.

Figure 13:
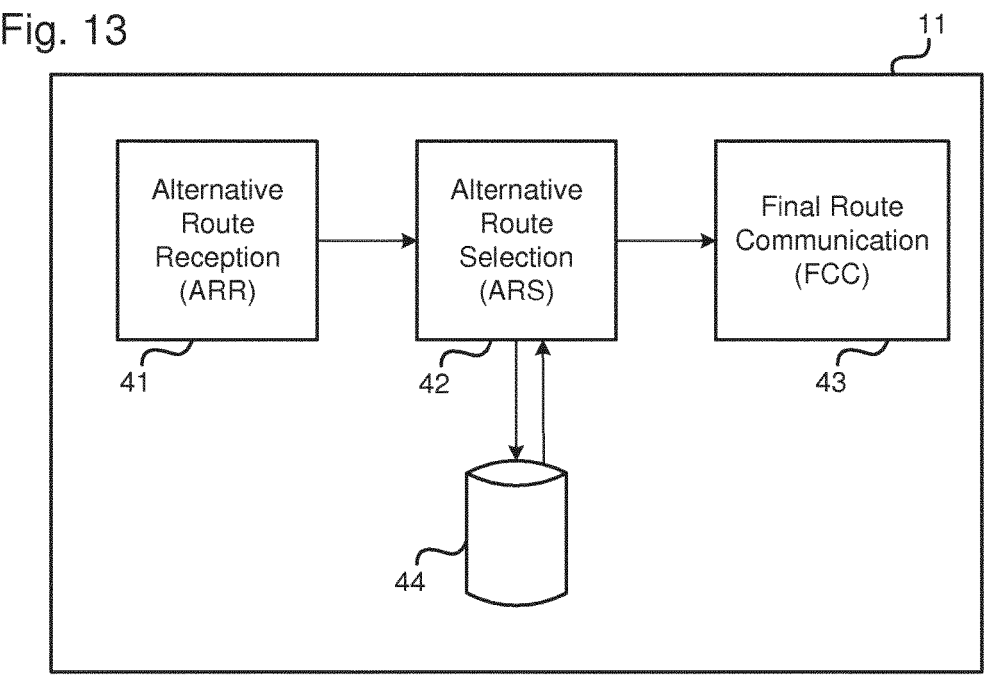
FIG. 13 is a schematic drawing of a route decision function.

FIG. 13 shows the structure of an RDF 11. The RDF 11 may be located at a different node from the RPF 10. It is responsible for receiving one or more proposals from one or more RPFs 10 and deciding which proposal should be accepted.

The RDF 11 may comprise an alternative route reception (ARR) module 41 which receives proposed paths from RPFs, an alternative route selection (ARS) module 42, which computes metrics for proposed paths according to a first predetermined algorithm and compares them according to a second predetermined algorithm to decide on a preferred path; and a final route communication (FRC) module 43 that sends an indication of the preferred path determined by the ARS 42 to an RIF 12.

In the RDF 11, assuming an in-band signaling approach in which all proposals are collected in a single message, the ARR module 41 will receive the message and identify it as a target for the alternative route selection process. This may be indicated by the ARPF header. The RDF 11 separates the multiple alternative route proposals present in the message. The alternative route selection module 42 decides which of all the alternative route proposals is to be used for routing to the final destination of the message. To the proposals received from the ARR 41, the ARS 42 may also add other options depending on the system or scenario. For example in VoLTE roaming, besides the alternative routes received from the proxies in the roaming leg (V-MNO 5 and IPX domains), it could add the option to route from within the H-MNO 4 itself (this equates to LBO-HR).

The selection of the final route will depend on local algorithms that may be based on predetermined metrics taking as input information present in the ARPF message. Definitions of those metrics may be stored in a non-transient form in an alternative route selection database 44. The FRC module 43 is responsible for sending the routing decision to the routing implementation function 12. If the ARS 42 selects one of the alternative route proposals received from a RPF 10, the FRC 43 will send an alternative route selection function message (ARSF message) that will specify that route, for example by providing the details of the route as received in the ARPF message. The routing message may be a SIP message having a header that designates its purpose. It may be directed to the address of the proposed route implementation function (RIF) 12 specified in the proposed RIF-URI header field discussed above. In the case of VoLTE Roaming, this could be a route header.

By sending the ARSF message header to the RIF 12 with the same fields received in the corresponding ARPF, the RDF 11 can in effect acknowledge all the features of the proposed route including the options. It can be expected that in many cases if there is an element of a route proposed by an RPF 10 that the RDF 11 would not like to implement (e.g. PRIF-URI, destination or path), the RDF 11 would not use that RPF 10 but select another one instead.

The RDF 11 may change or delete an option as proposed to it in the message sent to the RIF 12. In that way it can alter the behavior of the route. For example, in the case of VoLTE roaming the RPF 10 might modify the proposal by proposing MediaBypass enforcement whereby the media can be directly sent from the RIF 4 to a terminating node through a more optimal path without being tromboned, even without special support from the nodes in the intermediate roaming leg. Thus, with MediaBypass enforcement active, any SDP media port parameters received from prior nodes (between the RDF 11 and the RIF 12) can be overridden. The protocol may permit the RDF 3 to reject that option and remain anchored in the media path, e.g. for regulatory or other service reasons.

In the case of VoLTE roaming, the RDF 11 is located at the H-MNO 4 so it is in effect upstream of the RPFs 10, which may be at V-MNO 5 and IPX nodes 8 in the roaming-leg. For other use cases, more flexibility in the location of the RDF 11 could be provided using an out-of-band signaling mechanism as described above.

Figure 14:
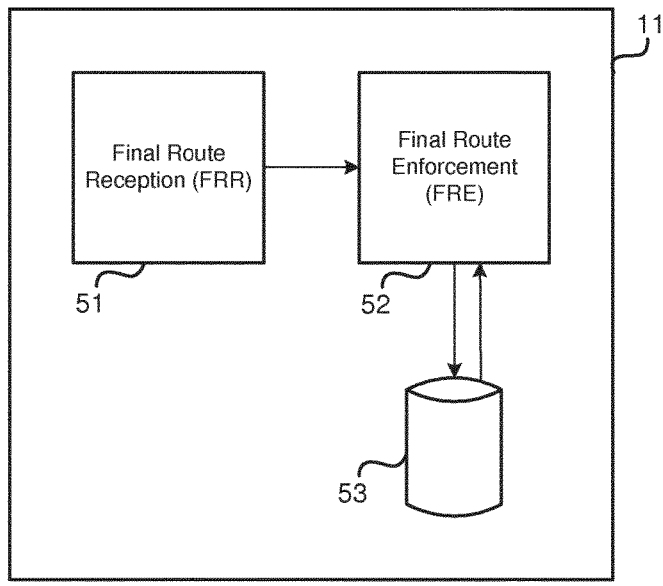
FIG. 14 is a schematic drawing of a route implementation function.

FIG. 14 illustrates the structure of the route implementation function (RIF) 12. The RIF 12 is responsible for routing messages that are subject to a route determined by the RDF 11 on that route. The RIF 12 receives the message from the RDF 11 indicating its decision on a route. The RIF 12 alters its routing configuration, e.g. its routing tables such as next hop data tables, to implement that route. The address headers of the outgoing packets that are to be subject to that route are configured by the RIF 12 so as to comprise complete routing information for subsequent nodes on the selected route. This causes those packets to be routed in accordance with the new route instead of a default routing. If the RDF 11 later issues an altered route then the RIF 12 can update the routing settings, and outgoing headers of the appropriate traffic, accordingly.

The RIF 12 may comprise a final route reception (FRR) module 51 which receives an indication of a preferred route decision from an RDF 11 and a final route enforcement (FRE) module 52 which implements the new route using the appropriate signaling protocols.

The final route reception (FRR) module 51, is responsible for receiving and identifying the message from the RDF 3 specifying a new route for certain traffic. The FRE module 52 is signaled by the FRR module 51 when the FRR 51 module receives a message specifying a new route. The FRR module 51 signals the details of that route, for example expected subsequent routing as indicated in the ARSF message header. The FRE 52 may use additional routing databases 53 to find the next hop specified as the first node in the path specified in the ARSF message. Preferably the FRE 52 does not modify the path list itself, but instead copies it in the relayed message. In the case of VoLTE roaming, this may be done using SIP route headers.

The RDF 11 may change some of the options originally proposed by the RPF 10. If the RIF 12 cannot apply one of such changed options, or another requirement of the new route, the RIF 12 can respond to the RDF 11 with a message rejecting the routing request. Optionally it may indicate the reason for rejecting the request.

Figure 5:
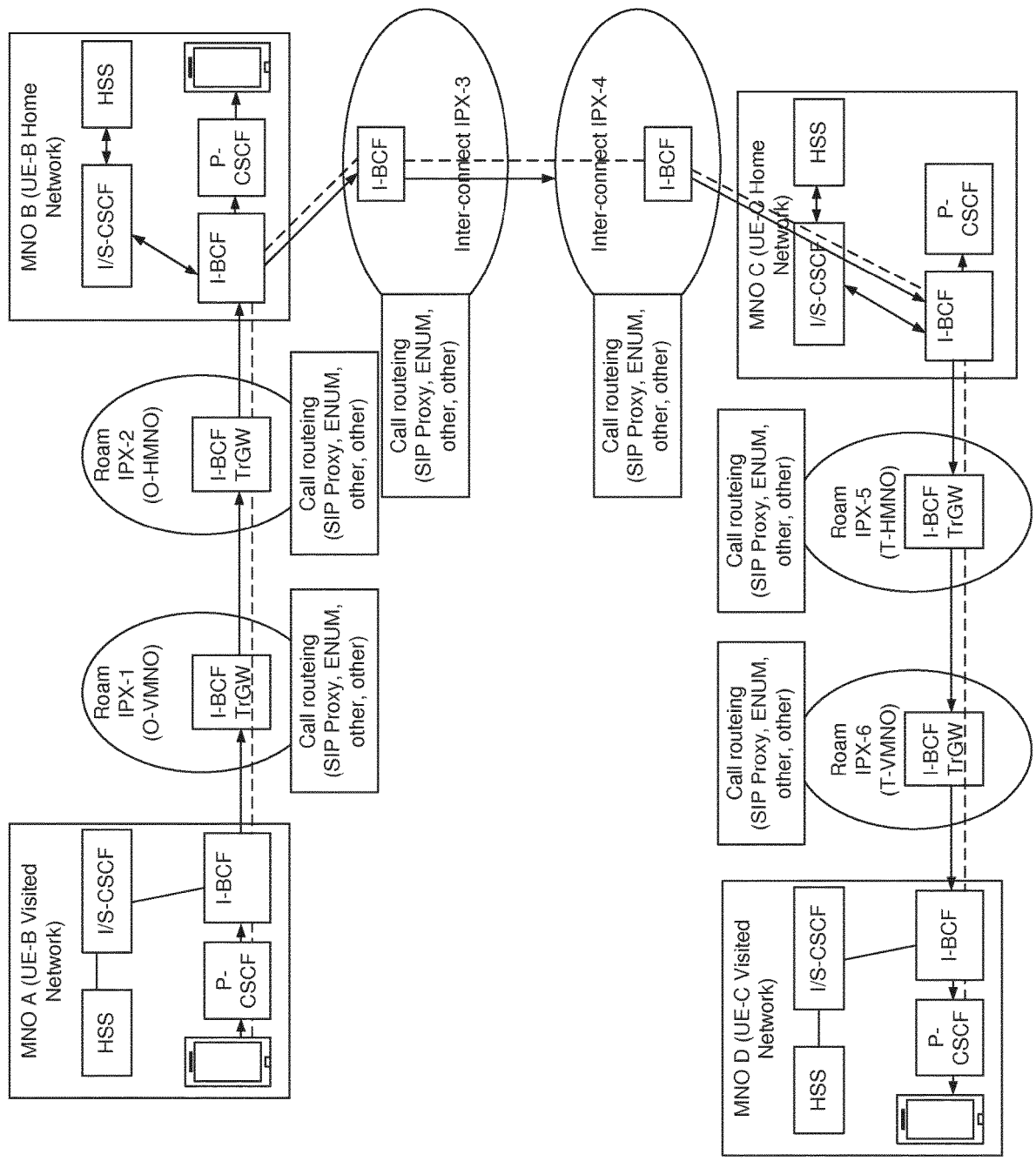
FIG. 5 illustrates an LBO U model.
Figure 6:
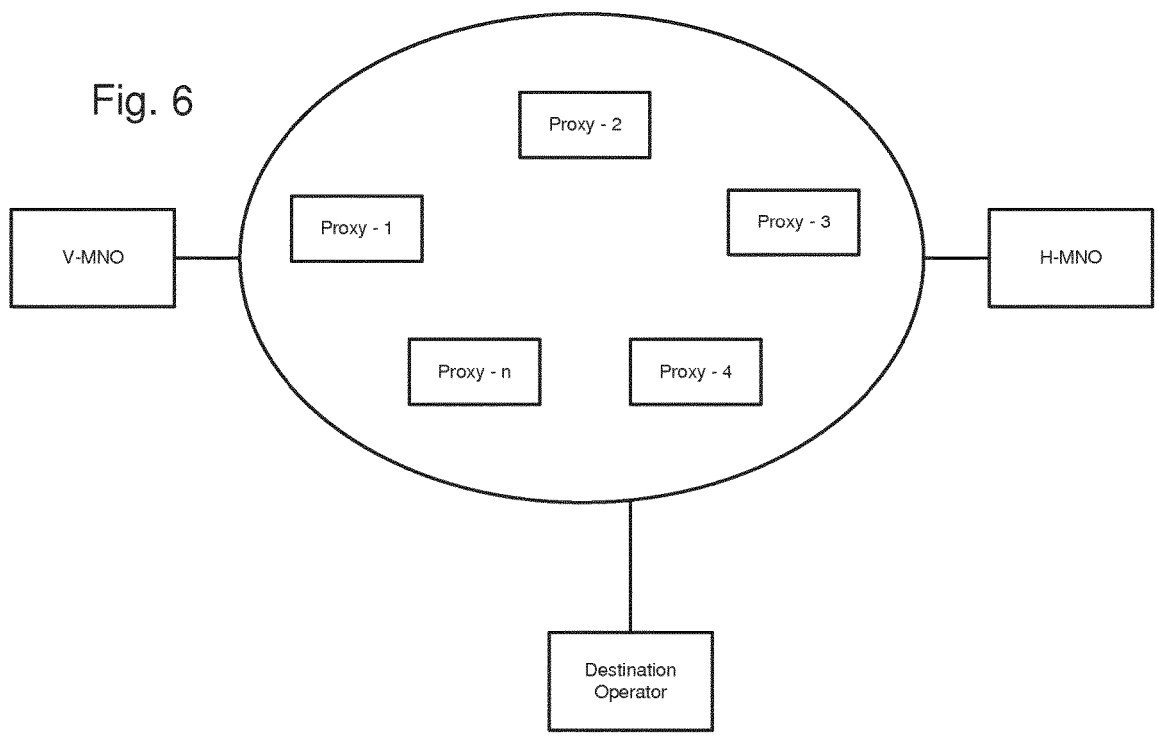
FIG. 6 is an abstraction of an end-to-end routing model.
Figure 7:
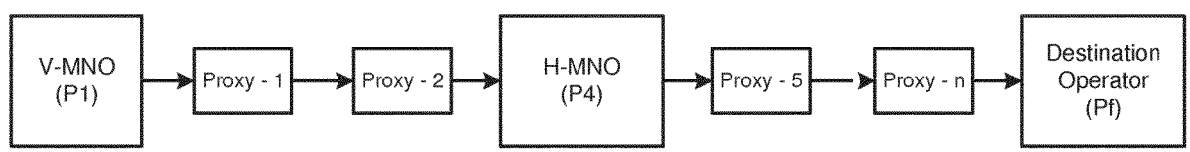
FIG. 7 is an abstraction of the LBO-HR routing model.
Figure 8:
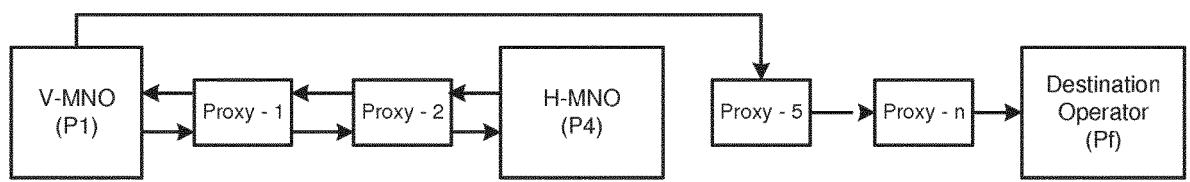
FIG. 8 is an abstraction of the LBO-VR routing model.
Figure 15:
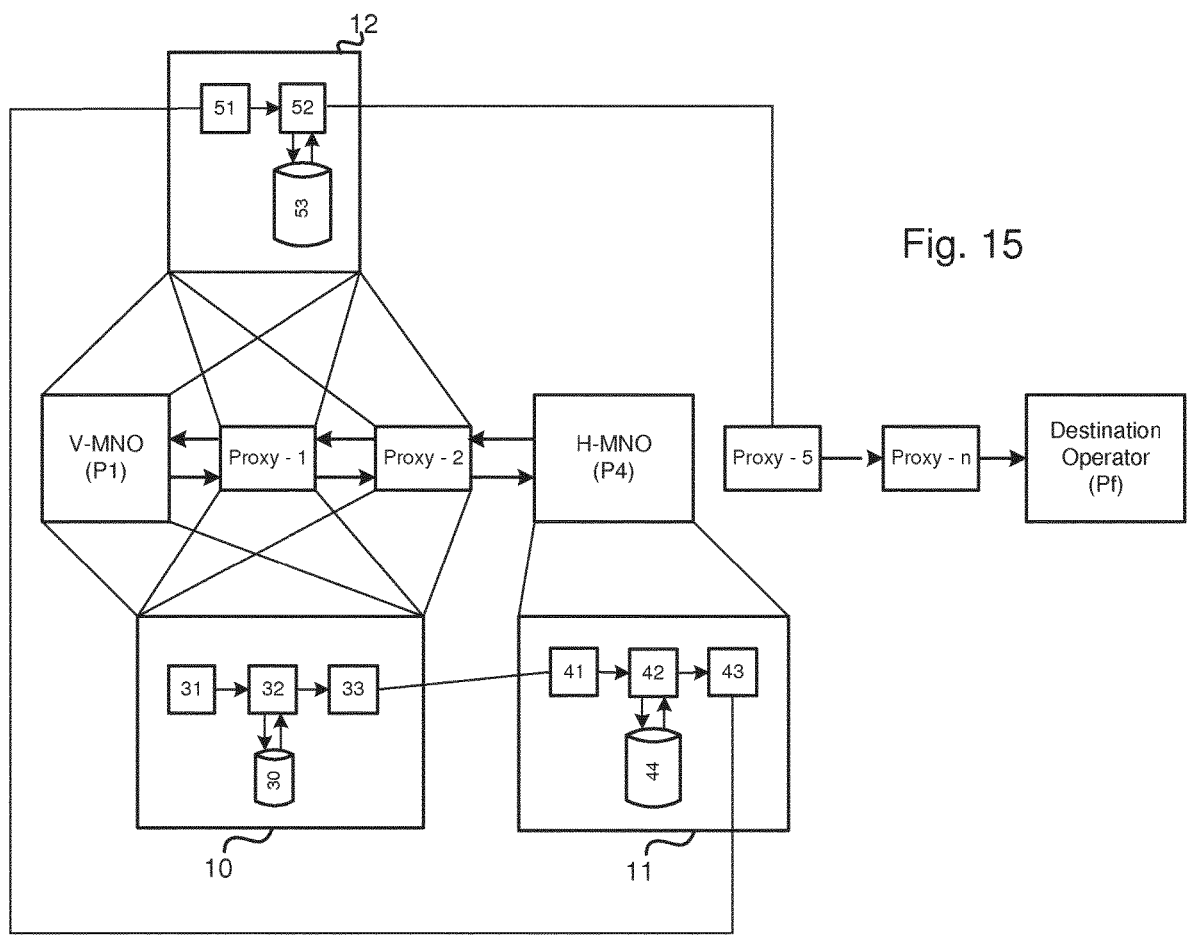
FIG. 15 shows a VoLTE roaming MOC scenario.

FIG. 15 shows an alternative representation of a typical VoLTE roaming MOC scenario of the type described in FIGS. 7 and 8, but using the routing elements described herein. The route proposal function 10 and the route implementation function 12 can be implemented by nodes P1, P2 and P3, and the route decision function 11 can be implemented by node P4.

Interaction between the three functions described above can follow different models. These may vary depending, for instance, on whether only one alternative route can be proposed or multiple alternative routes can be proposed, or on whether the communication between the functions is in-band or out-of-band to the normal call signaling routing protocol. These options will now be outlined.

Figure 16:
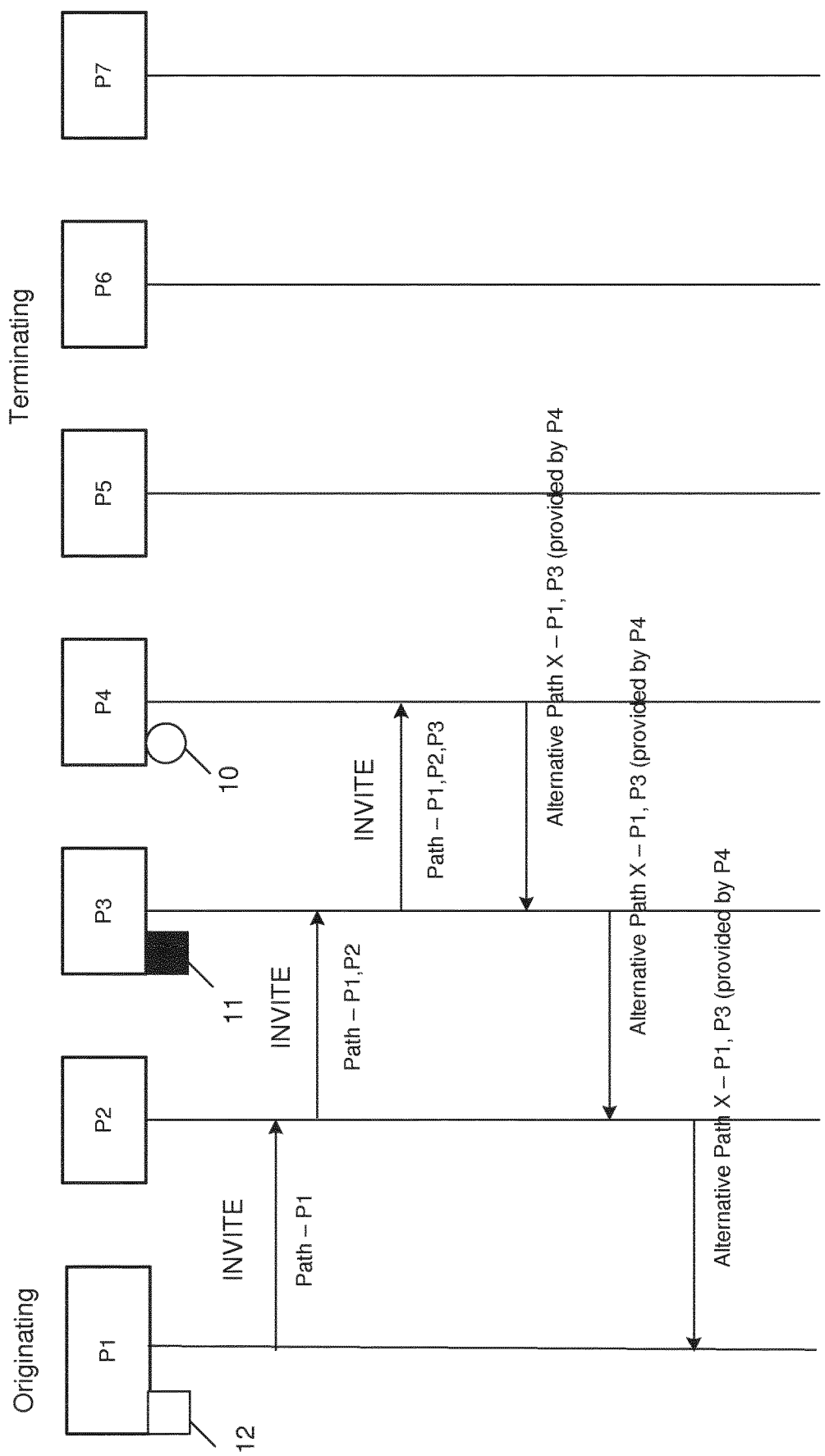
FIG. 16 illustrates operation with a single in-band alternative route proposal.

FIG. 16 shows the communication flow for an implementation option in which the RPF 11 is deployed in an intermediate node P4. This is a single alternative route proposal, in-band, option. P4 could be in an IPX or in any of the MNO networks involved in the end-to-end path of the routing for a call, e.g. the visited, home originating, home terminating or visited terminating network. The RDF 11 is deployed at an intermediate node P3, which could be any intermediate node. The RIF 12 can be deployed in any intermediate node.

In this implementation the route proposal function 10 at P4 provides a proposed alternative path X of P1-P3 as a response to the initial session establishment request (e.g. a SIP INVITE in this example). The alternative path request is evaluated by the route decision function 11, which will evaluate the proposed alternative path. For example, it may evaluate whether the provider of the alternative path (P4 in the example) is trustworthy and/or whether the proposed alternative path is compatible with appropriate routing policies, e.g. defined by one or more network operators. If the evaluation indicates that the process can proceed the RPF 11 passes the proposed alternative path to the RIF 12 (in this scenario at node P1) so that a new INVITE message can be issued with the new route part in it. In this example the invite message will be sent from P1 to P3 and not via P2. If required, the newly issued INVITE message will include a new parameter indicating the desired route for the session.

Figure 17:
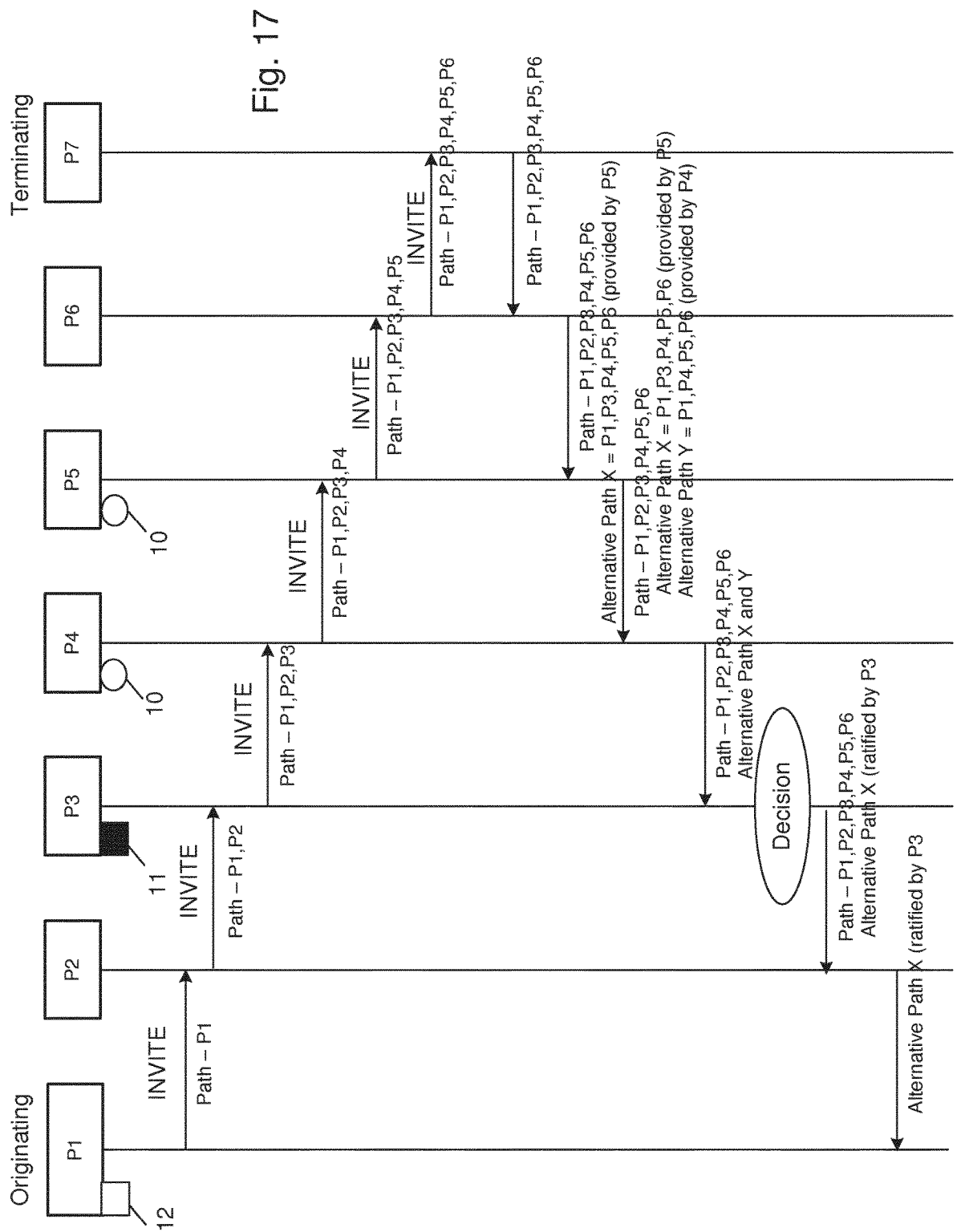
FIG. 17 illustrates operation with multiple in-band alternative route proposals.

A multiple alternative route proposals, in-band, option is illustrated in FIG. 17. In this option the principles of operation of the RPF 10, RDF 11 and RIF 12 are the same as in FIG. 16 except that:

1. There can be more than one alternative route proposal function. The initial INVITE message continues to the destination. On the way, one or more additional alternative route(s) can be inserted in the initial INVITE message. Consequently, more than one intermediate node functioning as an RPF 10 can now insert its own proposal into the response. If intermediate RPF nodes 2 implement the multiple alternative route proposals option, it enables an end-to-end view of routing in order for the system to make a better-informed routing proposal.
2. The alternative path(s) are, as explained above, inserted in the response to the original invite once it has reached its destination. In this example, a chain of INVITE messages goes to nodes P1-P2-P3-P4-P5-P6-P7. P7 is the terminating node. In that chain, node P5 functioning as an RPF 10 proposes an alternative path X of P1-P3-P4-P5-P6 and node P6 also functioning as an RPF 10 proposes an alternative path Y of P1-P4-P5-P6.
3. Node P3 functioning as a RDF 11 decides on path X and node P1 functioning as a RIF 12 implements routing the data over the selected path X.

Figure 18:
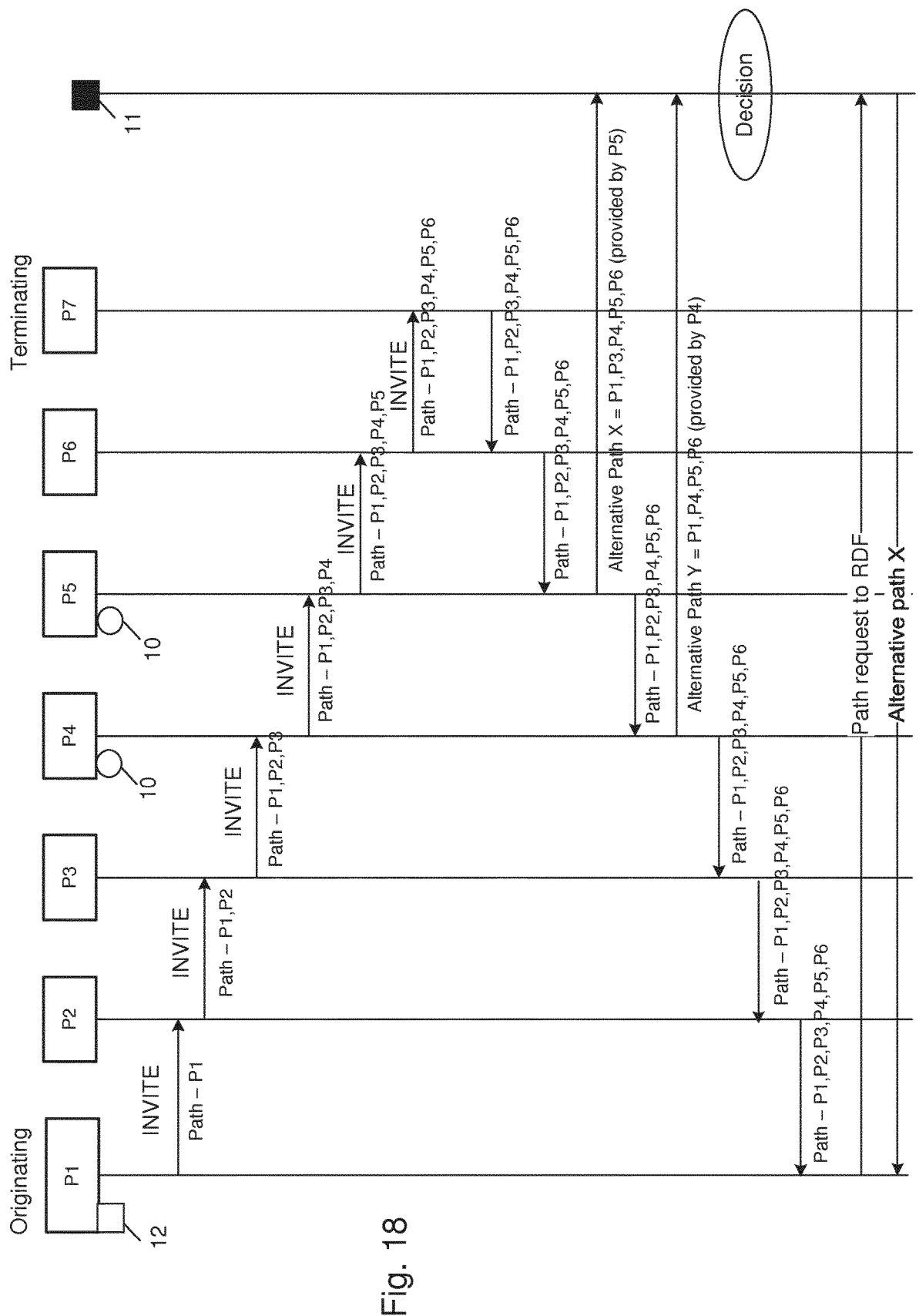
FIG. 18 illustrates operation with multiple out-of-band alternative route proposals.

A multiple alternative route proposals, out-of-band, option is illustrated in FIG. 18. In this third option, the alternative route proposed by RPFs 10 at node P4 and P5 are signaled out of band via a separate interface to a centralized route decision function 11. That function can make a decision and signal the outcome to the route implementation function 12 located at node P1. The RIF 12 can then issue a new INVITE message specifying a route selected by the centralized route decision function 11.

Embodiments of the arrangements described above can provide a number of advantages. For example, limitations. For example, they may provide end-to-end control over the path through nodes of the IPX network 7 to reach the H-MNO 4 from the V-MNO 5 in a roaming leg. The routing decision can be made with knowledge of the intermediate steps on the route, so it can accommodate any requirements to avoid certain nodes and/or operators. Tromboning can be avoided, as discussed above.

Whilst the present system has been described in the context of an IPX network implementing VoLTE connections, it may be implemented in other networks and for other types of traffic. The system may provide better routing in scenarios where application traffic is routed based on predefined paths or sections of the end-to-end path. It may allow independent application-layer routing nodes to provide benefits even without having without end-to-end visibility.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of managing traffic flow through a multi-node network, the multi-node network interlinking a first mobile network and a second mobile network via an Internetwork Packet Exchange (IPX) network, the method comprising:
when a subscriber user equipment entity, having as a home network the first mobile network and operating in the second mobile network, attempts to establish a connection to a correspondent user equipment entity:
communicating a connection request message from the second network to the first network over a first route through the IPX network for connecting the subscriber user equipment and the correspondent user equipment entity via a set of nodes of the multi-node network;
by at least one of the nodes of the set:
identifying at least one candidate alternative route through the IPX network for connecting the subscriber user equipment entity and the correspondent user equipment entity; and
transmitting an indication of the identified at least one candidate alternative route to a controller; and
the controller selecting, in accordance with predetermined criteria, one of the identified at least one candidate alternative route and causing the connection to be established between the subscriber user equipment entity and the correspondent user equipment entity over the selected candidate alternative route.

2. The method as claimed in claim 1, wherein:
identifying the at least one candidate alternative route comprises determining a metric of the at least one candidate alternative route;
the method comprises transmitting an indication of the metric to the controller; and
selecting the at least one candidate alternative route is performed in dependence on the indicated metric.

3. The method as claimed in claim 2, wherein the metric is one of estimated data loss, estimated delay, or a number of hops in the at least one candidate alternative route.

4. The method as claimed in claim 1, wherein selecting the at least one candidate alternative route is performed in dependence on an identity of an operator of at least one node of the first route or the at least one candidate alternative route.

5. The method as claimed in claim 1, wherein the identified at least one candidate alternative route interconnects with the second mobile network and a network in which the correspondent user equipment entity is operating.

6. The method as claimed in claim 1, wherein the identified at least one candidate alternative route interconnects with the second mobile network and a network in which the correspondent user equipment entity is operating without passing via the first mobile network.

7. The method as claimed in claim 1, further comprising the at least one node detecting a request to establish a connection; and wherein identifying the at least one candidate alternative route is performed in response to detecting the request to establish a connection.

8. The method as claimed in claim 7, wherein the request is a SIP session request.

9. The method as claimed in claim 7, further comprising the at least one node forwarding the request to a subsequent node on the first route; and wherein transmitting an indication of the identified at least one candidate alternative route to the first mobile network comprises the at least one node adding an indication of the identified at least one candidate alternative route to the request.

10. The method as claimed in claim 1, wherein transmitting an indication of the identified at least one candidate alternative route to the first mobile network comprises transmitting the indication by a route other than the first route.

11. The method as claimed in claim 1, wherein the controller is located in the first mobile network.

12. The method as claimed in claim 1, further comprising the controller defining an operational characteristic of the selected candidate alternative route, and causing the connection to be established between the subscriber user equipment entity and the correspondent user equipment entity over the selected candidate alternative route implementing that operational characteristic.

13. The method as claimed in claim 12, wherein the operational characteristic is MediaBypass enforcement.

14. A network routing node for routing traffic in a multi-node network, the multi-node network interlinking a first mobile network and a second mobile network via an Internetwork Packet Exchange (IPX) network, the network node containing processing circuitry, the processing circuitry being configured to cause the network node to:
detect a request to establish a connection between a subscriber user equipment entity, having as a home network the first mobile network and operating in the second mobile network, and a correspondent user equipment entity, the request traversing a first route through the IPX network for connecting the subscriber user equipment and the correspondent user equipment entity via a set of nodes of the multi-node network;

identify at least one candidate alternative route through the IPX network for connecting the subscriber user equipment entity and the correspondent user equipment entity; and transmit an indication of the identified at least one candidate alternative route to a route selection controller.

15. The network routing node as claimed in claim 14, the network routing node being configured to determine a metric of the identified at least one candidate alternative route and to transmit an indication of the metric to the route selection controller.

16. The network routing node as claimed in claim 14, the network routing node being configured to forward the request to a subsequent node on the first route and to transmit the indication of the identified at least one candidate alternative route to the route selection controller by adding an indication of the identified at least one candidate alternative route to the request.

* * * * *

UNITED STATES PATENT AND TRADEMARK OFFICE
CERTIFICATE OF CORRECTION

PATENT NO. : 11,405,849 B2
APPLICATION NO. : 15/733667
DATED : August 2, 2022
INVENTOR(S) : Francisco Faus Gregori et al.

Page 1 of 3

It is certified that error appears in the above-identified patent and that said Letters Patent is hereby corrected as shown below:

In the Drawings

Sheet 1 of 11, FIG. 2, delete "Call routeing" and insert -- Call routing --, therefor.

Sheet 2 of 11, FIG. 3, delete "Home MNO routeing" and insert -- Home MNO routing --, therefor.

Sheet 2 of 11, FIG. 3, delete "Destination routeing" and insert -- Destination routing --, therefor.

Sheet 2 of 11, FIG. 4, delete " 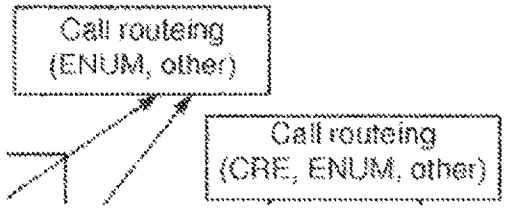 " and insert

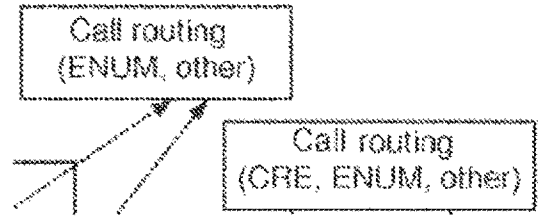

-- -- therefor.

Sheet 6 of 11, FIG. 11, for Tag "33", Line 4, delete "(ARCc)" and insert -- (ARCo) --, therefor.

Sheet 7 of 11, FIG. 13, for Tag "43", Line 3, delete "(FCC)" and insert -- (FRC) --, therefor.

Signed and Sealed this
Fourth Day of April, 2023

Katherine Kelly Vidal
*Director of the United States Patent and Trademark Office*

Sheet 10 of 11, FIG. 17, delete "[image: Path – P1,P2,P3,P4,P5,P6 / Alternative Path X (ratified by P3) / Alternative Path K (ratified by P3)]" and insert --[image: Path – P1,P2,P3,P4,P5,P6 / Alternative Path X (ratified by P3) / Alternative Path K (ratified by P3)]--, therefor.

In the Specification

In Column 1, Line 48, delete "(S8 interface home" and insert -- (S8 home --, therefor.

In Column 1, Line 62, delete "server" and insert -- session --, therefor.

In Column 1, Line 66, delete "Call Control" and insert -- Call Session Control --, therefor.

In Column 5, Line 30, delete "invention" and insert -- disclosure --, therefor.

In Column 5, Line 32, delete "invention" and insert -- disclosure --, therefor.

In Column 5, Line 45, delete "2 make" and insert -- 2 to make --, therefor.

In Column 5, Line 61, delete "analyses" and insert -- analyzes --, therefor.

In Column 6, Line 29, delete "RPF 21." and insert -- RPF 10.--, therefor.

In Column 6, Line 30, delete "(RPF 21)" and insert -- (RPF 10) --, therefor.

In Column 6, Line 34, delete "RPF 21" and insert -- RPF 10 --, therefor.

In Column 6, Line 37, delete "RPF 21" and insert -- RPF 10 --, therefor.

In Column 6, Line 39, delete "that an" and insert -- whether an --, therefor.

In Column 7, Line 7, delete "will receives" and insert -- will receive --, therefor.

In Column 7, Lines 52-53, delete "enforcement" and insert -- enforcement. --, therefor.

In Column 7, Line 67, delete "RDF 10" and insert -- RDF 11 --, therefor.

In Column 8, Line 11, delete "RDF 10." and insert -- RDF 11. --, therefor.

In Column 9, Line 9, delete "RIF 4" and insert -- RIF 12 --, therefor.

CERTIFICATE OF CORRECTION (continued)
U.S. Pat. No. 11,405,849 B2

In Column 9, Line 16, delete "RDF 3" and insert -- RDF 11 --, therefor.

In Column 9, Line 46, delete "RDF 3" and insert -- RDF 11 --, therefor.

In Column 10, Line 12, delete "RPF 11" and insert -- RPF 10 --, therefor.

In Column 10, Line 31, delete "RPF 11" and insert -- RPF 10 --, therefor.

In Column 11, Line 34, delete "invention" and insert -- disclosure --, therefor.

In Column 11, Line 38, delete "invention." and insert -- disclosure. --, therefor.